Figure 1:
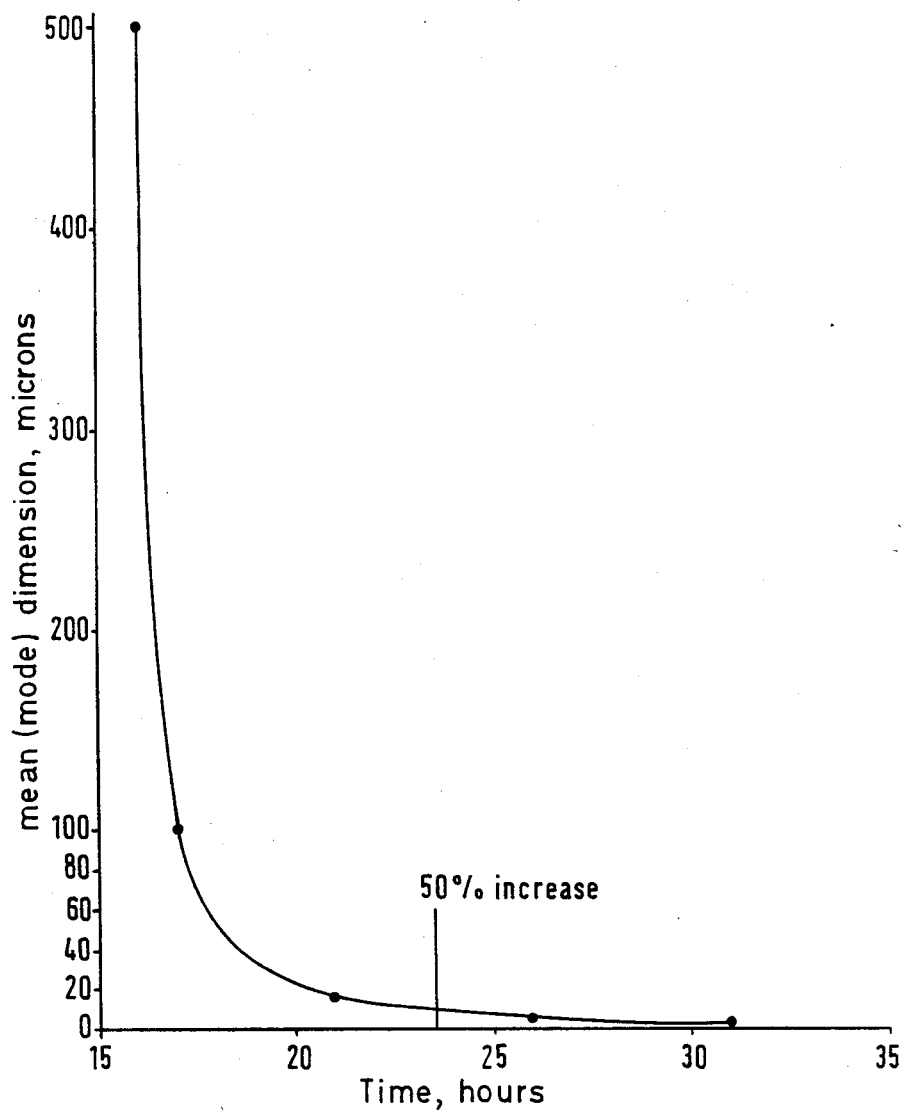

United States Patent [19]

Jackson et al.

[11] Patent Number: 4,918,182

[45] Date of Patent: Apr. 17, 1990

[54] SWEETENER

[75] Inventors: Graham Jackson, Reading; Michael R. Jenner, Goring-on-Thames, both of Great Britain

[73] Assignee: Tate & Lyle Public Limited Company, United Kingdom

[21] Appl. No.: 73,454

[22] Filed: Jul. 15, 1987

[30] Foreign Application Priority Data

Jul. 15, 1986 [GB] United Kingdom ................. 8617222

[51] Int. Cl.⁴ ....................... C07H 1/00; C07H 17/00; C07H 5/06
[52] U.S. Cl. .................................... 536/124; 536/122; 536/23; 536/55.3
[58] Field of Search ................. 536/124, 122, 23, 55.3

[56] References Cited

U.S. PATENT DOCUMENTS 4,343,934 8/1982 Jenner et al. ......................... 536/122
4,798,732 1/1989 Osawa .................................. 426/594

Primary Examiner—Ronald W. Griffin
Assistant Examiner—Pamela S. Webber
Attorney, Agent, or Firm—Ostrolenk, Faber, Gerb and Soffen

[57] ABSTRACT

Crystalline sucralose having a mean particle size of at most 10 microns, the maximum particle size being no more than twice the mean, exhibits enhanced stability to heat. Preferably the sucralose has a mean particle size of at most 5 microns and a maximum particle size of at most 10 microns. A method of enhancing the thermal stability of crystalline sucralose comprises jet milling the sucralose to reduce the particle size, and render the size distribution such that the maximum size is no more than twice the mean.

10 Claims, 1 Drawing Sheet

SWEETENER

This invention relates to a novel physical form of the high intensity sweetener sucrose (4,1', 6'-trichloro-4,1',6'-trideoxy galactosucrose) which is more stable to discolouration under hot, dry conditions than the known forms, and to a method of producing it.

Chlorosucrose sweeteners, i.e. compounds based on sucrose and galactosucrose in which one or more of certain hydroxy groups are replaced by chlorine atoms, are disclosed in British Patent No. 1,543,167. Of particular interest is sucralose, which was first isolated as a syrup (Fairclough, Hough & Richardson, Carbohydrate Research 40, 1975, 285–298) which could be solidified, e.g. by freeze drying, to form a powdery, hygroscopic glass. Later, a novel anhydrous crystalline form of sucralose was prepared, which was much less hygroscopic, as described in our British Patent No. 2,0675,646.

In general, anhydrous crystalline sucralose is relatively stable and inert. However, we have found that discolouration of crystalline sucralose can occur when it is stored under dry conditions at high ambient temperatures. For example, if pure dry crystalline sucralose is maintained at 100° C. the colour changes from white to pale brown after about 20 minutes. At 50° C. the same colour change is much slower, taking about 9 days. Such relatively minor colour changes can result in the product being out of specification for use in foods and beverages.

Surprisingly, we have now found that the thermal stability of dry crystalline sucralose can be considerably enhanced by reducing the particle size and limiting the size distribution. In practice the mean particle size should be half the maximum particle size and is desirable no more than 10 microns. Preferably the mean dimension is about 5 microns or less and the maximum dimension is about 10 microns or less, for example a mean of about 3 microns. It is unexpected that the reduced particle size would enhance stability: a smaller size with larger overall surface area can frequently lead to decreased stability because of a greater potential for oxidative processes.

It is important that the particles should be of relatively uniform size. Thus at a mean particle size of 5 microns or less, the maximum particle size should not exceed 10 microns, and preferably should not exceed 6 microns. At a mean particle size of from 2 to 3 microns, the maximum particle size should not exceed 6 microns, and preferably should not exceed 4 microns.

Sucralose crystals are typically needle shaped, although their size and shape may vary to some extent depending upon the temperature and upon the solvent from which they are obtained. Thus, crystallisation from aqueous solution typically yields crystals with dimensions of from 80 microns length up to about 800 microns, and crystallisation from organic solvents such as ethyl acetate usually yields smaller crystals, e.g. of 15×5 microns.

While it is possible to obtain relatively small crystals of sucralose by choosing the appropriate conditions for crystallisation it is difficult to control the crystallisation process to produce small particles of a small size distribution. Also, crystallisation from organic solvents may leave undesirable solvent residues in the product. Alternatively, the particle size of the crystalline material can be reduced by mechanical grinding but it is difficult to achieve a very small particle size by this means.

We have found that an effective method of reducing the particle size to the required dimensions is by jet milling, which utilises fluid energy to break the crystals into fine particles. In a jet mill the material to be pulverized is introduced into streams of elastic fluid, e.g. compressed air, in which the particles collide with each other (Albus, 10th Annual Powder and Bulk Solids Conference, Rosemont, May 1985, p.867–877). Jet mills are particularly suitable for grinding heat sensitive materials because they have no moving parts and the slight heat generated during the grinding is compensated by the cooling effect of the fluid as it expands at the jets through which it is introduced into the grinding chamber.

According to the present invention therefore we provide a method of enhancing the thermal stability of crystalline sucralose comprising jet milling to reduce the particle size and the size distribution. The mean particle size is preferably 5 microns or less at a maximum particle size of at most 10 microns and is most preferably 2 to 3 microns at a maximum particle size of at most 6 microns.

The elastic fluid used for the milling process is conveniently compressed air, typically at a pressure of from 207,000 Pa to 690,000 Pa.

The following examples illustrate the invention further.

EXAMPLE 1

Sucrose which had been crystallised from aqueous solution, having a crystal size of about 100×20 microns, was fed into a 30 cm (12 inch) "Micronizer" jet mill (Micron Mills Ltd, Addlestead Industrial Estate, Tonbridge Road, East Peckham, Kent, U.K.) at a rate of 15 kg/hour, using compressed air as the micronizing fluid.

When the jet mill was operated at a pressure of 206,820 Pa (30 p.s.i) the micronized product had a particle size ranging from about 3×3 microns to about 6×6 microns, most of the particles measuring about 5×5 microns. At higher operating pressures of 413,640, 551,520 and 689,400 Pa (60, 80 and 100 p.s.i.), the micronized product had a particle size from about 1×1 to 4×4 microns, with most particles measuring about 3×3 microns. The particle size did not vary appreciably with operating pressure over this range.

EXAMPLE 2

Sucralose crystals with a particle size of about 100×20 microns, from the same batch as those used in Example 1, and micronized sucralose from Example 1 were subjected to a constant temperature of 65° C. in open dishes, and the time taken for a pale brown colour to develop was recorded. The results were as follows:

| Material | Time to development of pale brown colour at 65° C. |
| --- | --- |
| Sucralose crystals | 17 hrs |
| Micronized sucralose (5 × 5 microns) | 26 hrs |
| Micronized sucralose (3 × 3 microns) | 31 hrs |

EXAMPLE 3

Sucralose crystals (maximum diameter: 100% less than 700 microns; mean 500 microns) were fed at a rate of 30 Kg/hr to a 20 cm (8 inch) Micronizer mill via a vibratory trough feeder. The mill operated at a chamber pressure of 689,400 Pa (100 p.s.i) to produce a product of particle size: 100% less than 4 microns, mean size 2 microns. When tested by the method of Example 2, the product had a browning time at 65° C. of 29 hours, while the feedstock had a time of 15 hours.

In a second run a similar feedstock (browning time 16 hours) was milled at 25 kg/hr to provide a product of the same size as in the first run, browning time 31 hours at 65° C.

EXAMPLE 4

Sucralose crystals, crystallised from ethyl acetate solution, having dimensions of about 15×5 microns (mean) were tested as in Example 2:

| sucralose crystallised from: | mean size | stability at 65° |
| --- | --- | --- |
| water | 100 × 50 microns | 17 hours |
| ethyl acetate | 15 × 5 microns | 21 hours |
| jet-milled sucralose | 3 × 3 microns | 31 hours |

Figures from Examples 2 to 4 were plotted in FIG. 1. The time to discolour at 65° can be increased from 16 hours to 31 hours or more. 50% increase is achieved at a mean dimension of 10 microns.

We claim:

1. Crystalline sucralose having enhanced thermal stability and a mean particle size of at most 10 microns, the maximum particle size being no more than twice the mean.
2. The crystalline sucralose of claim 1 having a mean particle size of at most 5 microns and a maximum particle size of at most 10 microns.
3. The crystalline sucralose of claim 1 having a maximum particle size of at most 6 microns.
4. The crystalline sucralose of claim 1 having a mean particle size of from 2 to 3 microns and a maximum particle size of at most 6 microns.
5. The crystalline sucralose of claim 4 having a maximum particle size of at most 4 microns.
6. A process of enhancing the thermal stability of crystalline sucralose which comprises jet milling the sucralose to reduce the particle size, and render the size distribution such that the maximum size is no more than twice the mean.
7. The process of claim 6, wherein the particle size is reduced to a mean of no more than 10 microns.
8. The process of claim 7, in which the particle size is reduced to a mean dimension of at most 5 microns at a maximum particle size of at most 10 microns.
9. The process of claim 7, in which the particle size is reduced to a mean dimension of 2 microns at a maximum particle size of at most 6 microns.
10. The process of claim 6, in which the milling is effected at a fluid pressure of 207,000 Pa to 690,000 Pa.

* * * * *